United States Patent [19]
Cunningham et al.

[11] 3,766,714
[45] Oct. 23, 1973

[54] SECONDARY REMOVAL OF INERTS IN ETHYLENE OXIDE PURIFICATION

[75] Inventors: Jack W. Cunningham, Oakland; E. Gordon Foster, Emeryville; Robert G. Vanderwater, El Cerrito, all of Calif.

[73] Assignee: Shell Oil Company, New York, N.Y.

[22] Filed: Oct. 4, 1971

[21] Appl. No.: 185,987

[52] U.S. Cl. .......................................... 55/48, 55/51
[51] Int. Cl. ............................................. B01d 19/00
[58] Field of Search ...................... 55/44, 48, 51, 68, 55/55, 84, 89; 260/348.5

[56] References Cited
UNITED STATES PATENTS 3,165,539  1/1965  Lutz .......................................... 55/51
3,174,262  3/1965  Lutz .......................................... 55/51

*Primary Examiner*—Charles N. Hart
*Attorney*—Howard W. Haworth et al.

[57] ABSTRACT

Small amounts of inert gaseous components in admixture with ethylene oxide and water vapor are removed therefrom, and the ethylene oxide recovered as an aqueous fraction, by (a) cooling the mixture so as to effect its partial condensation; (b) phase separating the partially condensed mixture into condensate and vapor fractions; (c) separately cooling the condensate and vapor fractions to a temperature no lower than 11° C; (d) countercurrently contacting the cooled condensate with at least a portion of the cooled vapor fraction in an ethylene oxide reabsorption zone; and (e) removing from the reabsorption zone an inerts vent as overhead and an aqueous ethylene oxide fraction, substantially free of inerts, as bottoms.

7 Claims, 3 Drawing Figures

SECONDARY REMOVAL OF INERTS IN ETHYLENE OXIDE PURIFICATION

BACKGROUND OF THE INVENTION

This invention relates to the recovery of ethylene oxide from mixtures which contain carbon dioxide, low molecular weight hydrocarbons, and other inert materials. More particularly, it deals with the recovery of ethylene oxide, such as that prepared by the silver-catalyzed oxidation of ethylene, from mixtures containing inert reaction components. Specifically, a processing sequence is disclosed which permits recovery of ethylene oxide, as an aqueous fraction substantially free of inerts, while (1) minimizing yield losses to ethylene glycols by hydrolysis, (2) avoiding the dangers of compressing gaseous streams containing a high proportion of ethylene oxide, and (3) avoiding the blockage of flow lines and process equipment due to the formation of solid ethylene oxide-water hydrates.

THE PRIOR ART

On an industrial scale, ethylene oxide is generally manufactured by the silver-catalyzed oxidation of ethylene. The effluent from the oxidation reactor will contain relatively small quantities of ethylene oxide in admixture with substantial amounts of unconverted ethylene and oxygen, as well as appreciable quantities of inert materials such as carbon dioxide, low molecular weight hydrocarbons, and fixed gases like argon and nitrogen.

Removal of the admixed inerts from ethylene oxide produced via conventional technology proceeds in stages. Generally, the effluent from the oxidation is contacted with water in an absorption zone, from which a portion of the unabsorbed, inert and unconverted gases leave as an overhead stream. A majority of the absorber overhead, rich in ethylene is recycled to the oxidation reactor. The aqueous absorbate produced as a bottom product is subjected to the stripping action of steam, as shown, for instance, in Courter, U.S. Pat. No. 2,756,241 (issued July 24, 1956), to recover an overhead, gaseous mixture of inerts, ethylene oxide, and steam. The stripping zone overhead is then subjected to at least one additional stage of inerts removal, for example, the techniques illustrated by Lutz, U.S. Pat. No. 3,165,539 (issued Jan. 12, 1965) or U.S. Pat. No. 3,174,262 (issued Mar. 23, 1965). Additional treatment of the ethylene oxide, to remove offending quantities of aldehydes, water and glycols, is required for the production of an epoxide suitable for sale or further conversion. One such treatment is shown by Gilman et al., U.S. Pat. No. 3,418,338 (issued Dec. 27, 1968).

In removing admixed inert materials from ethylene oxide, whether in the initial absorption zone or in downstream, secondary stages, a number of stringent processing conditions must be observed because of the peculiar chemical reactivity and physical properties of the epoxide. If the ethylene oxide production facility is to be operated in a safe and economical manner, among other things, (1) ethylene oxide-water mixtures should be processed below a temperature of about 125° C to minimize yield losses of epoxide to ethylene glycol, diethylene glycol, and higher polyols by hydrolysis; (2) the recovery system should be operated at a pressure at or above atmospheric, so as to avoid drawing air into process equipment and the formation of potentially explosive mixtures; (3) compression of high concentration ethylene oxide gaseous streams should, if possible, be avoided, because of the pressure- and thermal-sensitivity of such mixtures; and (4) in condensing any water-ethylene oxide vapor, and in cooling aqueous ethylene oxide liquids, coolant temperatures must be no lower than 11° C, to avoid formation of solid water-ethylene oxide hydrates (see Maass et al., $J.\ Am.\ Chem.\ Soc.$, Vol. 44, pp. 1709, 1721–1723 (1922)) which would result in blockage of the process equipment and flow lines.

An examination of prior art methods for effecting the secondary removal of inerts and other materials from ethylene oxide, for example, the disclosures of Lutz and Gilman et al., shows operating conditions at variance with the above-indicated preferences. Thus, exemplary procedures include (1) preheating the aqueous, ethylene oxide stripping zone feed to temperatures of 90°–150° C; (2) internal equipment pressures as low as 5 psia; and (3) compression of gaseous streams containing 25 percent by weight ethylene oxide or more.

Thus, a need exists for a simple method by which a secondary removal of inerts may be achieved under conditions which respect the peculiar sensitivity of ethylene oxide.

BRIEF SUMMARY OF THE INVENTION

It has now been found that small amounts of inert gaseous components in admixture with ethylene oxide and water vapor are removed therefrom, and the ethylene oxide recovered as an aqueous fraction, by (a) cooling the mixture so as to effect its partial condensation; (b) phase separating the partially condensed mixture into condensate and vapor fractions; (c) separately cooling the condensate and vapor fractions to a temperature no lower than 11° C; (d) countercurrently contacting the cooled condensate with at least a portion of the cooled vapor fraction in an ethylene oxide reabsorption zone; and (e) removing from the reabsorption zone an inerts vent as overhead and an aqueous ethylene oxide fraction, substantially free of inerts, as bottoms.

BRIEF DESCRIPTION OF THE DRAWINGS

In FIG. 2, a portion of the inerts-free, aqueous ethylene oxide leaving the reabsorption zone as a bottoms product is mixed with the vapor fraction from the partial condensation prior to cooling of the mixed vapor.

In FIG. 3, the entire bottoms product from the reabsorption zone is mixed with the vapor fraction of the partial condensation, the resulting mixture being subjected to a second partial condensation. Here, the condensate from the second partial condensation comprises the desired inerts-free aqueous ethylene oxide product.

DETAILED DESCRIPTION OF THE INVENTION AND THE DRAWINGS

Figure 1:
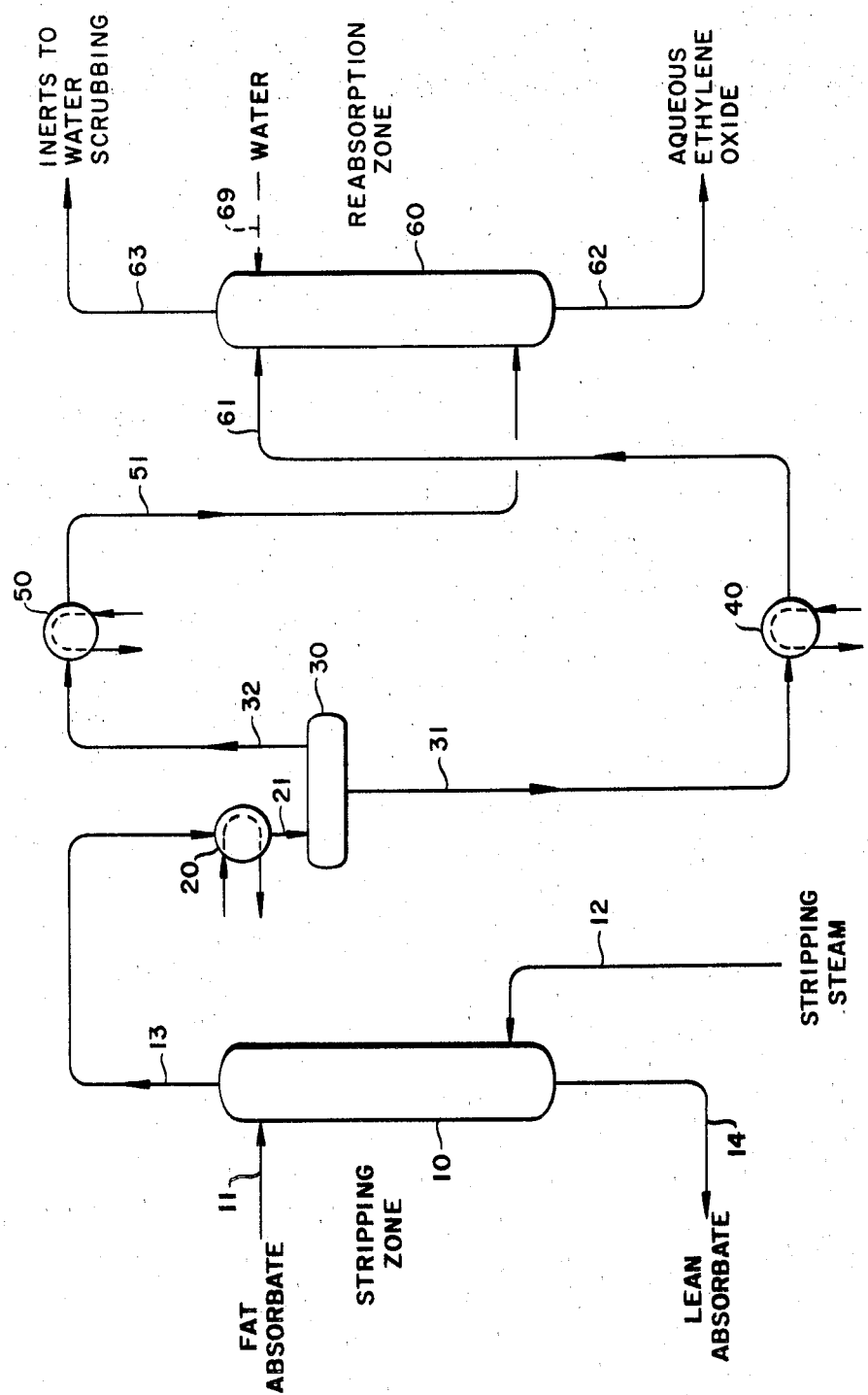
FIG. 1 diagrammatically illustrates the basic processing sequence of the present invention, wherein the overhead from an ethylene oxide stripping zone is partially condensed, the condensate and vapor fractions therefrom being (1) separately cooled, and (2) countercurrently contacted in a ethylene oxide reabsorption zone.

The process of the present invention is particularly suitably applied to effecting a secondary removal of inerts from the effluent of an oxidation reactor in which ethylene and oxygen, under the influence of a silver catalyst, have combined to form ethylene oxide. The effluent leaving the oxidation reactor will generally be at a pressure of about 150 to about 350 psia and at a temperature of about 210° to about 290° C. Its composition may vary, comprising from about 0.5 to about 3 percent ethylene oxide, up to about 35 percent ethylene, as much as 6 percent oxygen, and about 0.5 to about 15 percent carbon dioxide. Other inerts such as nitrogen, argon, methane, and ethane, and the like may also be present in the oxidation reactor product.

Such dilute ethylene oxide mixtures are cooled to a temperature of about 40° to about 90° C, and thereafter absorbed in an aqueous stream by known methods to effect a primary separation of ethylene oxide from unreacted ethylene, oxygen, and other gaseous components in the oxidation reactor effluent. Suitable absorption conditions are temperatures from about 15° to about 50° C, and pressures from about 100 to about 300 psia. The unabsorbed, gaseous materials, rich in ethylene, are suitable for recycle to the catalytic oxidation reactor. The inerts content of the initially produced aqueous absorbate may be reduced prior to being treated by the process of the present invention, for example, the flashing at a temperature below about 65° C, as shown in co-pending application Ser. No. 155,959, filed July 8, 1971.

The aqueous ethylene oxide absorbate contains ethylene oxide in dilute concentration, together with some dissolved carbon dioxide and other gaseous inerts. This fat absorbate passes to the stripping zone of the present invention, from which liquid aqueous bottoms and gaseous overhead, the latter comprising a predominance of ethylene oxide and water, together with some carbon dioxide and other inerts, are withdrawn. The stripping zone is operated at a pressure above atmospheric, preferably from about 16 to about 36 psia. Maintaining such pressures within the stripping zone simultaneously (1) avoids drawing air into the system, thus preventing the formation of potentially explosive ethylene oxide-containing mixtures, and (2) minimizes the extent of ethylene oxide hydrolysis of glycols. The bottoms fraction from the stripping zone, essentially free of ethylene oxide, optionally may be recycled, and after cooling, employed to absorb ethylene oxide contained in additional gaseous oxidizer effluent. Suitable stripping action is maintained within the stripping zone by adding a stripping gas, for example steam, to the lower portion thereof.

The mole ratio of water to ethylene oxide in the overhead product from the stripping zone is maintained at about 2 to about 3. Although not critical to the operation of the present invention, mole ratio of inerts to ethylene oxide in the stripping zone overhead ratio is kept as low as possible, so as to facilitate a high ethylene oxide recovery downstream.

The overhead product from the stripping zone is partially condensed by cooling it to a temperature of about 35° to about 50° C. Condensate and vapor fractions may be separately removed from a suitable accumulating device downstream of the partial condenser. Alternatively, the required heat transfer surface and phase separator may be combined in a single item of equipment. In the present invention, this partial condenser functions as a source of lean absorbant for use in the reabsorption zone, as described hereinafter. For most effective use of this condensate in the downstream reabsorption zone, it should contain only a small portion of the ethylene oxide present in the stripping zone overhead. Typically, the ethylene oxide content of the condensate from the partial condenser is about 5 to about 10 mole percent.

To recover the ethylene oxide contained in the vapor fraction from the partial condensation, it is necessary to contact this stream with a suitable absorbant. One such absorbant is water. A preferred absorbant, one generated within the process of the present invention, is the condensate produced in the partial condensation. If the liquid and vapor fractions from the partial condensation are immediately contacted, little recovery of the ethylene oxide contained in the latter will be achieved, since these two streams are in phase equilibrium. However, if the liquid from the partial condensation is cooled, its ability to absorb the ethylene oxide contained in the vapor fraction from the partial condensation is greatly enhanced. Separate cooling of the liquid and vapor fractions from the partial condensation lowers the ethylene oxide vapor pressure and allows a more complete removal of the epoxide from the partial condensation vapor during subsequent contacting. Generally, the liquid and vapor fractions should be cooled to a temperature no lower than 11° C, if the formation of solid ethylene oxide-water hydrates is to be avoided, with concomitant blockage of flow lines and process equipment. Preferably, each of these streams is cooled to a temperature of about 14° to about 30° C. The vapor and liquid fractions may be cooled to the same extent; alternatively, they may be independently cooled to different temperatures within the range of 11° to about 30° C.

In the basic flow configuration, the cooled condensate and at least a portion of the vapor fraction from the partial condensation are contacted countercurrently in a reabsorption zone, to product an aqueous ethylene oxide stream, substantially free of inerts, as bottoms, and an ethylene oxide-inerts mixture as tops. Generally, the ethylene oxide content of the overhead from the reabsorption zone will be from about 20 to about 65 mole percent. The epoxide is recovered from this stream, for example, by scrubbing with a suitable aqueous absorbant. Alternatively, the ethylene oxide content of the reabsorption zone tops may be lowered by feeding thereto a suitable aqueous absorbant, for example, water, from a source external to the process of the present invention. Water supplied from an external source may be combined with the cooled condensate from the partial condensation to form a lean absorbant for the reabsorption zone. Where externally derived water is used in conjunction with cooled condensate, the former is added to the top of the reabsorption zone while the latter, containing some ethylene oxide, is introduced at an intermediate location. Up to 5 moles of water, in addition to cooled condensate, may be fed to the reabsorption zone per mole of ethylene oxide in the top product of the stripping zone.

FIG. 1 shows the basic processing sequence of the present invention. Fat absorbate, such as is produced by contacting the effluent from the silver-catalyzed oxidation of ethylene with water in a conventional absorption zone, is fed to stripping zone 10 through line 11. Stripping action is achieved by feeding steam to stripping zone 10 through line 12. The bottom product from stripping zone 10, flowing in line 14, comprises a lean aqueous absorbant suitable for the treatment of additional oxidation reactor effluent. The overhead product from the stripping zone 10, flowing in line 13, is cooled in heat exchanger 20 to a temperature of about 35° to about 50° C, thereby condensing most of the water, but only a small portion of the ethylene oxide contained therein. The partially condensed stripping zone overhead passes through line 21 to phase separator 30 (heat exchanger 20 and phase separator 30 may be combined in a single item of equipment and function as a partial condenser). Condensate exits phase separator 30 via line 31, and vapor leaves via line 32. Liquid and vapor fractions from the partial condensation are separately and independently cooled to a temperature no lower than 11° C, and preferably to about 14° to about 30° C in heat exchangers 40 and 50, respectively. A portion of the vapor fraction flowing in line 32 will normally be condensed in heat exchanger 50. Cooled condensate and vapor fractions from the partial condensation pass to reabsorption zone 60 through lines 61 and 51, respectively. Within reabsorption zone 60, which operates at a top pressure of about 15 to about 35 psia, a substantial portion of the ethylene oxide contained in the vapor fraction entering from line 51 is recovered by contact with the cooled condensate entering from line 61. The bottom product from reabsorption zone 60, flowing in line 62, is an aqueous ethylene oxide stream substantially free of inert gases. The overhead from reabsorption zone 60, flowing in line 63, comprises ethylene oxide in admixture with inert gases and water. Since the ethylene oxide content of this overhead stream may vary between about 20 and about 65 mole percent, this small fraction is customarily treated further to recover the ethylene oxide. The ethylene oxide contained in the top product of reabsorption zone 60 may be conveniently recovered by scrubbing in a suitable contacting device with an aqueous fraction, for example, water, the fat absorbate being returned, for example, to stripping zone 10. Alternatively, the ethylene oxide content of the overhead from reabsorption zone 60 may be reduced by feeding water or a suitable lean aqueous absorbant to reabsorption zone 60 through line 69.

Figure 2:
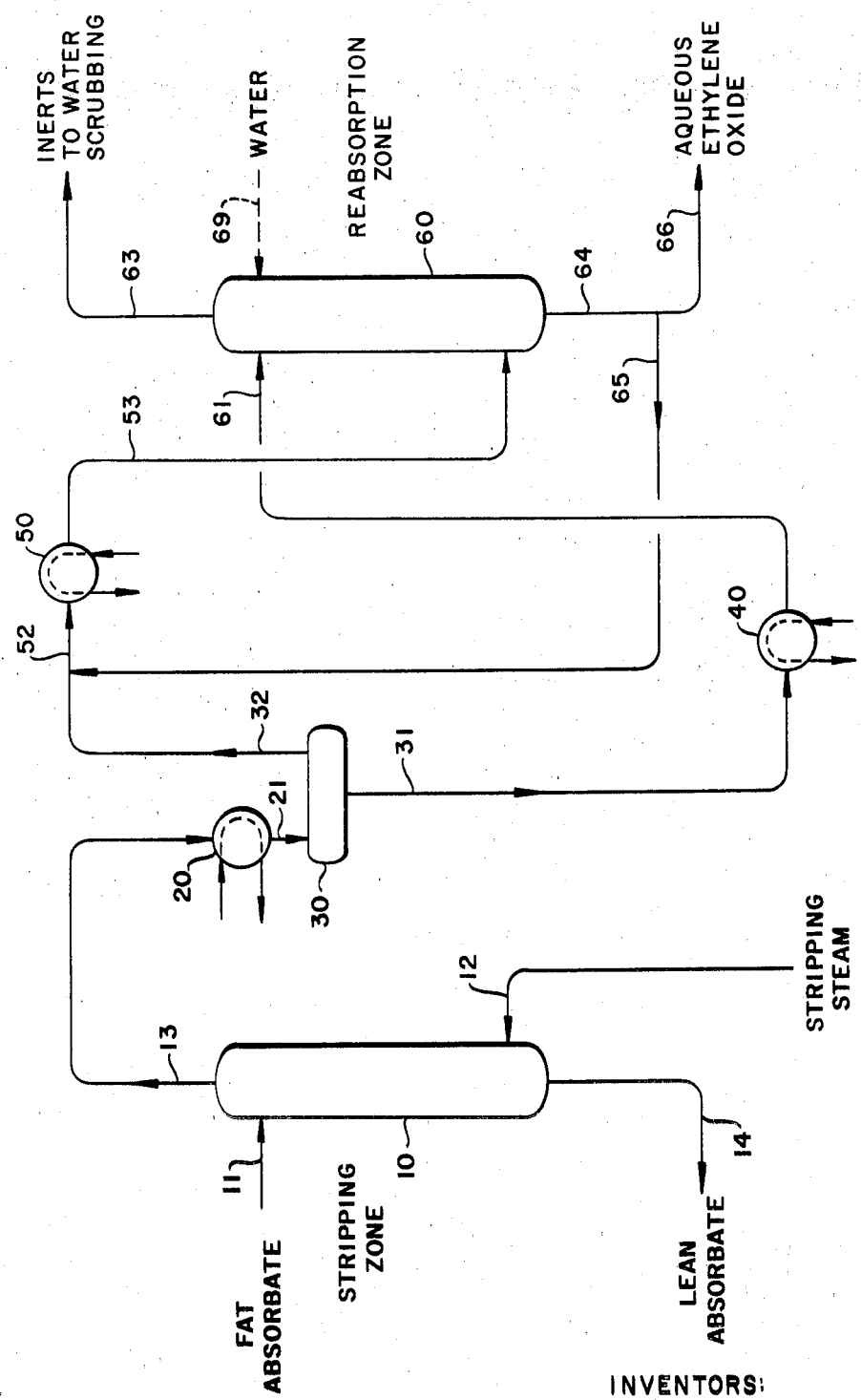
FIG. 2 represents an alternate embodiment of the flow sequence shown in FIG. 1.

In absorbing the ethylene oxide contained in the vapor entering the reabsorption zone, a substantial amount of latent heat of condensation is liberated. If this heat is not removed, the descending liquid in the reabsorption zone will become warmer, thus reducing its ability to absorb ethylene oxide. One method of reducing this difficulty is to recycle at least a portion of the bottom product from the reabsorption zone, mix it with the vapor fraction produced in the partial condensation, cool the resulting stream, as described above, and feed the cooled mixture to the reabsorption zone. FIG. 2 illustrates this alternate embodiment of the basic processing sequence.

In FIG. 2, stripping zone 10, heat exchanger 20, phase separator 30, heat exchanger 40, and their interconnecting flow lines operate in substantially the same manner as that described in FIG. 1. Here, however, the bottoms from reabsorption zone 60, flowing in line 64, is divided into an aqueous ethylene oxide product, substantially free of inerts, flowing in line 66, and a recycle aqueous ethylene oxide stream passing through line 65. Partial recycle stream 65 is mixed with the vapor produced in the partial condensation, which flows in line 32. The resulting mixture, flowing in line 52, is cooled in heat exchanger 50 to a temperature no lower than 11° C, and preferably to from about 14° to about 30° C. Heat exchanger 50 functions as a partial condenser, the effluent from which passes through line 53 without phase separation to reabsorption zone 60.

In the processing sequence of FIG. 2, the liquid recycled to heat exchanger 50 via line 65 dilutes the condensate formed therein. Since the ethylene oxide content of the condensate will be greater than that in recycle stream 65, the effectiveness of the latter will be greatest if heat exchanger 50 is designed to avoid the separation of liquid and vapor phases therein. Immediate dilution of the condensate permits a greater fraction of ethylene oxide to be condensed, for a given heat exchanger exit temperature. Where immediate dilution of the condensate is effected without phase separation in heat exchanger 50, less vapor is fed to reabsorption zone 60, and the heat of condensation to be removed from the latter is reduced. In turn, the temperature of reabsorption zone bottoms product 64 is lower, thus permitting a more nearly completely recovery of ethylene oxide therein.

A preferred embodiment of the processing sequence of the present invention involves the complete recycle of the bottom product from the reabsorption zone for mixing with the vapor fraction from the partial condenser. The resulting stream is then subjected to a second partial condensation, again at a temperature no lower than 11° C, and preferably at about 14° to about 30° C. The vapor fraction from the second partial condensation is fed to the reabsorption zone, while the liquid condensate comprises the desired aqueous ethylene oxide product. This particular variation has the benefit of removing the aqueous ethylene oxide product at the lowest temperature in the system, where the volatility of ethylene oxide is at a minimum, and where the absorption capacity of an aqueous absorbant is at a maximum. This preferred embodiment is illustrated in FIG. 3.

Figure 3:
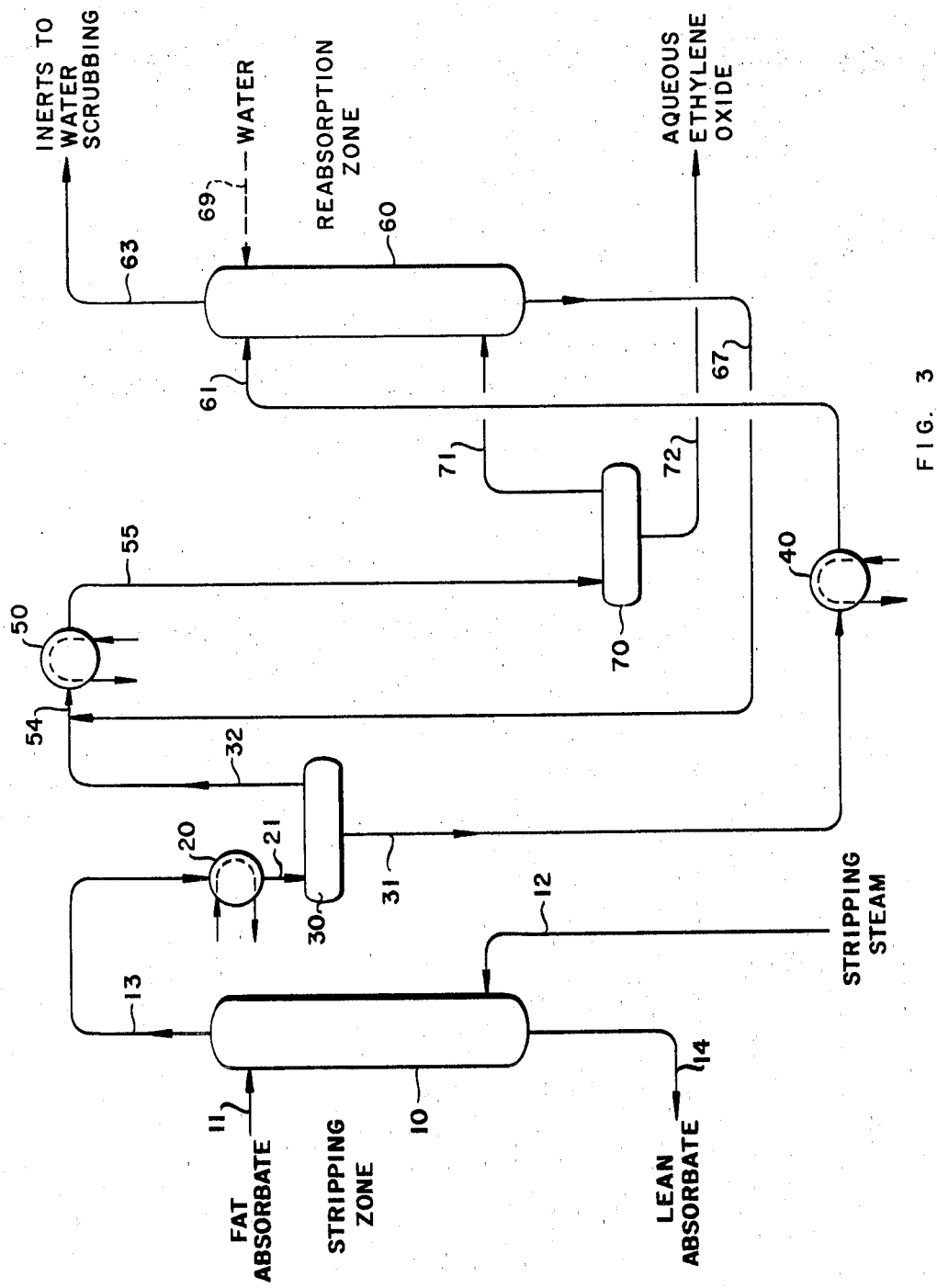
FIG. 3 represents a preferred embodiment of the processing scheme shown in FIG. 1.

In FIG. 3, legends identical to those of FIGS. 1 and 2 are employed for items of equipment which perform the same function and for flow lines through which identical streams pass. In FIG. 3, the entire bottom product from reabsorption zone 60, is passed through line 67 to mix with the vapor produced in partially condensing the overhead from stripping zone 10, and flowing in line 32. The resulting mixture, flowing in line 54, is cooled to a temperature of no lower than 11° C, and preferably to from about 14° to about 30° C, in heat exchanger 50. A two phase stream passes from heat exchanger 50 through line 55 to phase separator 70, which may be combined as an integral partial condenser. Aqueous ethylene oxide, substantially free of inerts is removed from phase separator 70 via line 72. The vapor from the second partial condensation effected in heat exchanger 50, and flowing in line 71, is fed to reabsorption zone 60. By producing maximum heat removal in heat exchanger 50, the embodiment of the present invention shown in FIG. 3 results in smallest reabsorption zone load. With a given coolant temperature level, no lower than 11° C, this particular variation permits a lower stripping zone pressure than those shown in FIGS. 1 and 2, with a concomitantly lower amount of ethylene oxide hydrolysis therein.

ILLUSTRATIVE EMBODIMENT

Fat absorbate, produced by contacting the effluent from a silver-catalyzed oxidation of ethylene with water in an absorber, is fed to the preferred embodiment of the process of the present invention, as illustrated in FIG. 3, through line 11. Stripping zone 10 operates at a pressure of 23 psia and top and bottom temperatures, respectively, of 100° and 114° C. The stripping zone overhead is partially condensed in heat exchanger 20 by being cooled to a temperature of 38° C. Condensate leaving accumulator 30 is cooled in heat exchanger 40 to 16° C. The vapor fraction from the partial condensation, after mixing with the bottom product from reabsorption zone 60, is likewise cooled to 16° C in heat exchanger 50. The mixture is separated in phase separator 70 at a temperature of 16° C and a pressure of 18.2 psia. Aqueous ethylene oxide, substantially free of inerts leaves the process through line 72. The overhead from the partial condensation, flowing in line 71, is contacted, in reabsorption zone 60, with cooled condensate from the first partial condensation, flowing in line 61. In reabsorption zone 60, the top and bottom pressures are 17.1 and 18.2 psia, respectively; the corresponding temperatures are 16° and 24° C. Approximate temperatures, pressures, flow rates, and molar compositions of various process streams are shown in the accompanying table.

Approximate Temperatures, Pressures, Flow Rates, and Molar Compositions

| Stream | 13 | 31 | 32 | 67 | 54 | 71 | 72 | 63 |
|---|---|---|---|---|---|---|---|---|
| Temperature, °C | 100 | 38 | 38 | 24 | ≈30 | 16 | 16 | 16 |
| Pressure, psia | 23.0 | 19.2 | 19.2 | 17.8 | 19.0 | 18.2 | 18.2 | 17.1 |
| Flow, moles/unit time | 1000 | 749 | 251 | 767 | 1018 | 33 | 985 | 14.7 |
| Molar Composition, % | | | | | | | | |
| Fixed gases [a] | 0.1 | Tr [b] | 0.4 | Tr | 0.1 | 2.8 | Tr | 6.3 |
| Ethylene | 0.1 | Tr | 0.3 | Tr | 0.1 | 2.4 | Tr | 5.4 |
| Carbon dioxide | 0.5 | Tr | 2.0 | Tr | 0.5 | 15.4 | Tr | 33.6 |
| Ethylene Oxide | 29.6 | 8.3 | 93.0 | 10.4 | 30.8 | 78.0 | 29.2 | 53.2 |
| Water | 69.7 | 91.7 | 4.3 | 89.6 | 68.5 | 1.4 | 70.8 | 1.5 | a) Normally gaseous components such as nitrogen, oxygen, argon, and methane.
b) Trace quantities, i.e., less than 0.05%.

We claim as our invention:

1. In a process for removing inert oxidation mixture components from ethylene oxide produced by the silver-catalyzed oxidation of ethylene, wherein a primary inerts removal is effected by contacting the oxidation reaction effluent with a lean aqueous absorbant in an absorption zone to remove a majority of the inert components and produce a fat, ethylene oxide-containing absorbate, and thereafter contacting the fat, ethylene oxide-containing absorbate with a stripping gas in a stripping zone, the improvement which comprises
   a. cooling the stripping zone overhead so as to effect its partial condensation;
   b. phase separating the partially condensed stripping zone overhead into condensate and vapor fractions;
   c. separately and independently cooling the condensate and vapor fractions to a temperature no lower than 11° C;
   d. countercurrently contacting the cooled condensate with at least a portion of the cooled vapor fraction in an ethylene oxide reabsorption zone; and
   e. removing from the reabsorption zone an inerts vent as overhead and an aqueous ethylene oxide fraction, substantially free of inerts, as bottoms.

2. The process of claim 1 wherein the phase separated condensate and vapor fractions are separately and independently cooled to a temperature of from about 14° to about 30° C.

3. The process of claim 1 wherein the stripping zone overhead is cooled to a temperature of about 35° to about 50° C.

4. The process of claim 1 wherein the cooled portion of the vapor fraction is countercurrently contacted with cooled condensate and up to 5 moles of water per mole of ethylene oxide in the stripping zone overhead.

5. The process of claim 1 wherein the cooled condensate fraction is countercurrently contacted with all of the cooled vapor fraction in the ethylene oxide reabsorption zone.

6. The process of claim 1 wherein at least a portion of the reabsorption zone bottoms is recycled and mixed with the vapor fraction immediately following phase separation of the partially condensed stripping zone overhead.

7. The process of claim 6 wherein
   a. all of the reabsorption zone bottoms is recycled and
   b. the cooled mixture of partial condensation vapor fraction and ethylene oxide reabsorption zone bottoms is phase separated to produce cooled, ethylene oxide reabsorption zone vapor fraction feed and an aqueous ethylene oxide liquid, substantially free of inerts.

* * * * *